United States Patent [19]

Miyata

[11] Patent Number: 4,506,122

[45] Date of Patent: Mar. 19, 1985

[54] SELECTION SWITCH

[75] Inventor: Muneyoshi Miyata, Tokyo, Japan

[73] Assignee: Mitsuku Denshi Kogyo Kabushiki Kaisha, Tokyo, Japan

[21] Appl. No.: 493,567

[22] Filed: May 11, 1983

[30] Foreign Application Priority Data

May 22, 1982 [JP] Japan ................................ 57-75500
May 22, 1982 [JP] Japan ................................ 57-75501

[51] Int. Cl.³ .............................................. H01H 3/16
[52] U.S. Cl. ............................. 200/61.58 R; 200/287; 200/DIG. 34; 360/25
[58] Field of Search ................. 200/61.58 R, 61.58 B, 200/61.59, 61.6, 61.61, 61.62, 61.63, 61.64, 61.65, 61.66, 61.69, 61.7, 61.71, 61.72, 61.73, 61.74, 61.75, 61.76, 61.78, 61.79, 61.8, 61.81, 61.82, 61.83, 61.84, DIG. 34, 286, 287, 1 A, 61.41, 61.42

[56] References Cited

U.S. PATENT DOCUMENTS 3,978,303  8/1976  Miyata ............................... 200/1 A Primary Examiner—A. D. Pellinen
Assistant Examiner—Morris Ginsburg
Attorney, Agent, or Firm—Oblon, Fisher, Spivak, McClelland & Maier

[57] ABSTRACT

A selection switch is disclosed which is capable of accomplishing a clearly defined and smooth switching operation and contributing to the miniaturization of an apparatus such as a tape recorder. The switch includes a guide member for guiding a cassette of a tape by bending one of spring-biased contact members and a selector having a triangular projection outwardly projecting from the guide member wherein the triangular projection is backwardly pushed by the cassette while bending the other spring-biased contact member as a function of the shape of the cassette to actuate contacts of the contact members, to thereby select the deformation.

5 Claims, 12 Drawing Figures

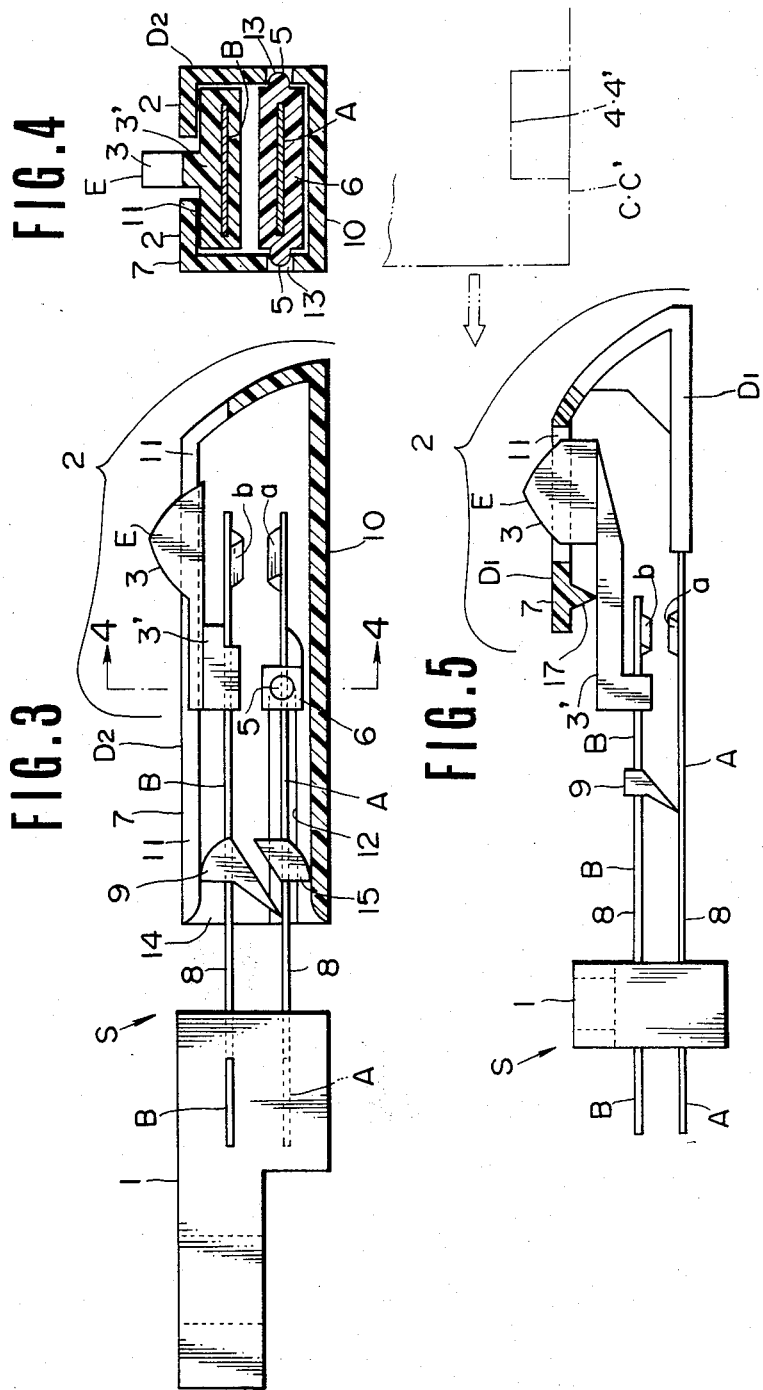

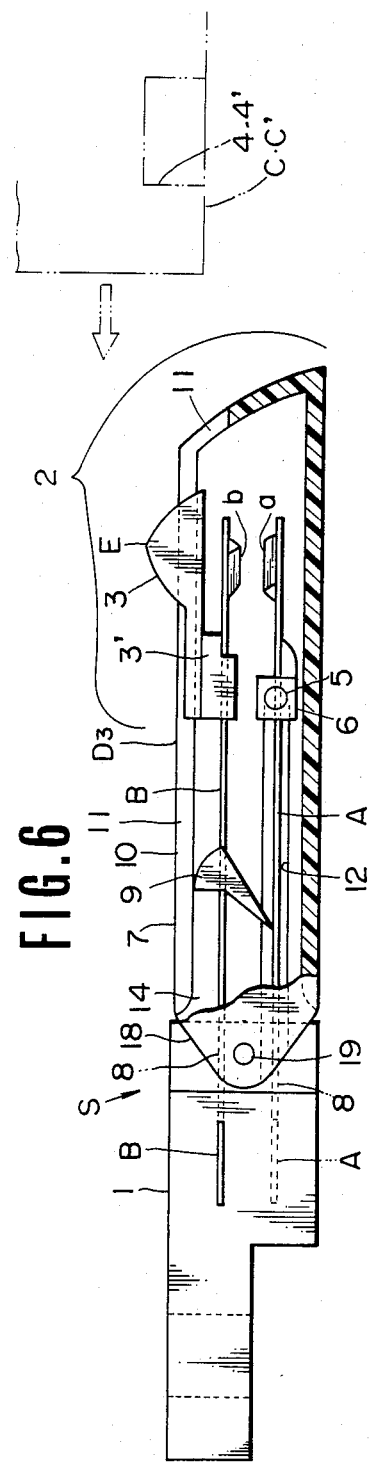
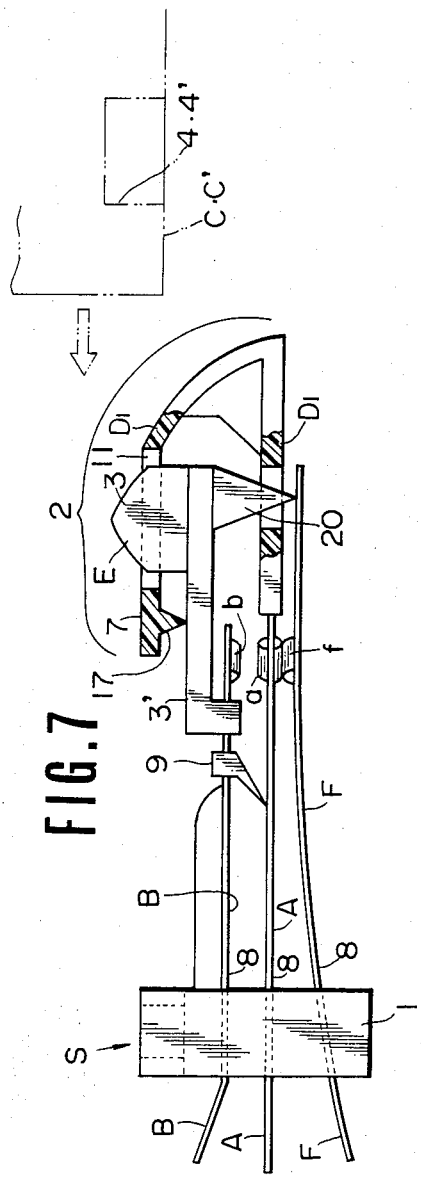

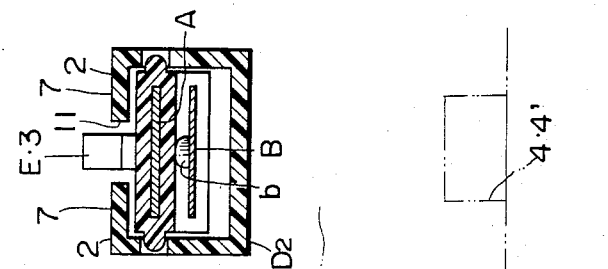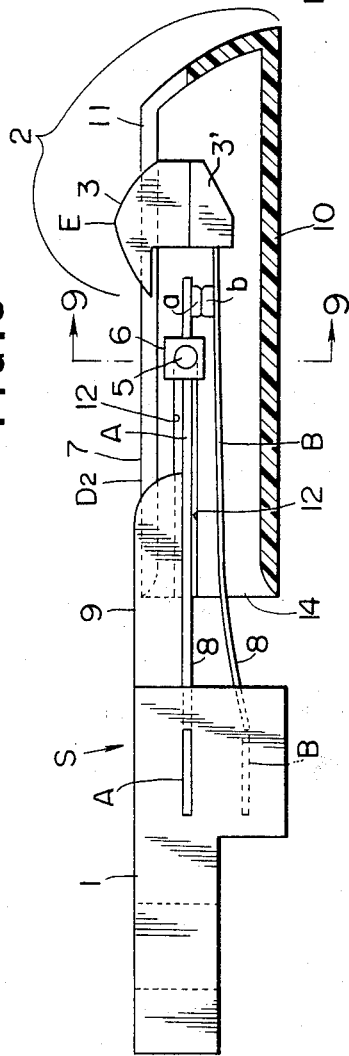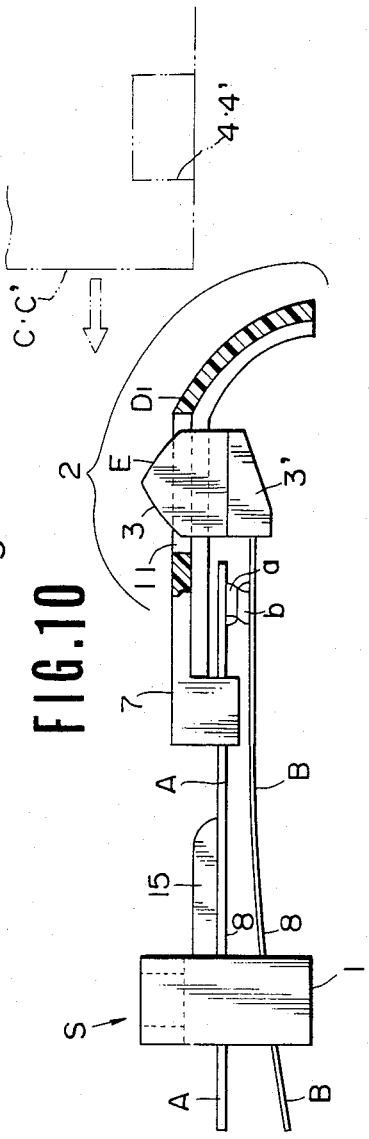

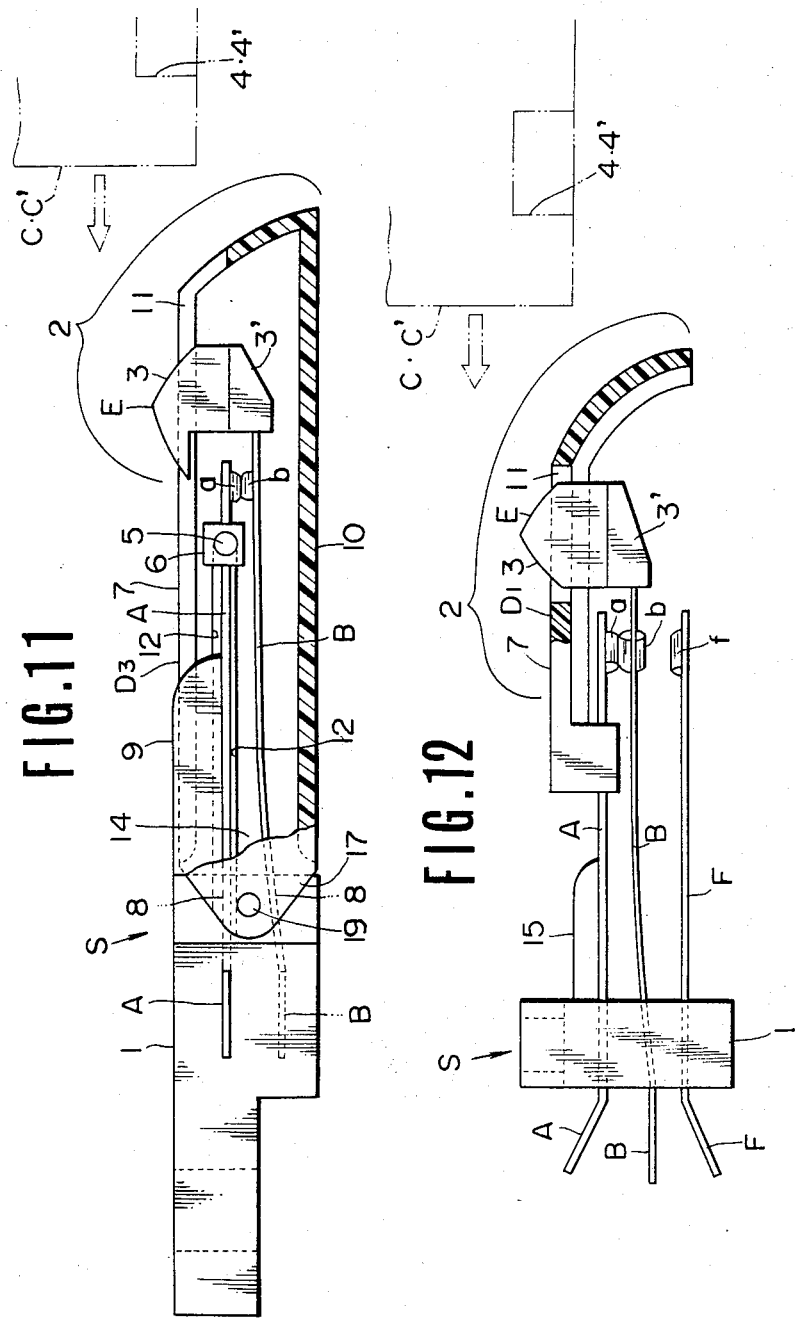

SELECTION SWITCH

BACKGROUND OF THE INVENTION

1. Field of the Invention

This invention relates to a switch, and more particularly to a selection switch which, at the time of inserting cassette tape such as a sound tape, a video tape, a magnetic tape or the like in an apparatus such as a tape recorder, a video tape recorder, a magnetic memory or the like, is adapted to select, identify or detect the type of tape received in the cassette and the like to automatically carry out a desired switch operation.

2. Description of the Prior Art

Identification of the type of a tape received in a cassette such as, for example, a chrome tape, a metal tape, a regular tape or the like, and discrimination as to whether there is a recording on the tape in the cassette, or the like has been conventionally carried out by altering the position of a recess formed on the rear surface of a cassette. For this purpose, an apparatus such as a tape recorder, a video tape recorder or the like is provided with selection switch mechanisms at positions thereof corresponding to recesses of a cassette inserted in the apparatus so that contacts of the switch may be actuated in response to the cassette insertion operation.

A conventional selection switch mechanism of such type is typically constructed in a manner as shown in FIG. 1. The mechanism comprises a plurality of selection switch bodies 21 provided independent from one another in, for example, a frame 16 of a tape recorder or the like and levers 22 corresponding to the switch bodies 21 and provided in proximity thereto. The moment of the end portion of each of the levers 22 due to a recess 4' formed on the rear surface of a cassette C' acts to actuate the switch body 21.

There are two kinds of cassettes with respect to the use of such recess. One is the type in which a recess 4' is initially opened. The other is the type in which the recess 4' is initially closed by a cover 23 so that the back surface of the cassette may be regarded as substantially flat and thereafter the cover is removed by bending to prevent the erasure of a recording on a tape and/or the re-recording on a tape (FIG. 2).

Unfortunately, cassettes for a recording tape and the like which are significantly different in depth 1 have been conventionally manufactured depending upon manufacturers, particularly, foreign manufacturers. Also, such cassettes are different in dimensions of the recess 4'. In order to account for such variations in dimensions among the cassettes, the conventional selection switch mechanism is constructed to allow the lever 22 to carry out a wide movement. However, such construction has disadvantages of not allowing a well defined and smooth switching operation and of requiring a large area for installation, so that the conventional selection switch is an obstacle to the miniaturization of an apparatus such as a tape recorder, a video tape recorder or the like.

BRIEF SUMMARY OF THE INVENTION

The present invention has been made in view of the foregoing disadvantages of the prior art.

Accordingly, it is an object of the present invention to provide a selection switch capable of accomplishing a well defined and smooth switching operation irrespective of the dimension differences among cassettes to be inserted, and substantially contributing to miniaturization of an apparatus in which the selection switch is to be used; when a predetermined portion of an object such as a cassette comes into contact with a guide surface of a switch body along a predetermined direction and is placed at a predetermined position with respect to the switch, a selector is formed at a position to allow contact provided on spring-biased contacts members to be contacted with or separated from each other as a function of the shape of the object, to thereby accomplish a switching operation for detecting or selecting the type of the cassette or a switching operation in relation to the detection or selection.

In accordance with the present invention, there is provided a selection switch comprising an insulating base. At least two spring-biased contact members are embedded at a part thereof in the base so as to extend in parallel with each other from the base; contacts are respectively provided on the spring-biased contact members so as to oppose each other with constant spacing. A guide member having a guide surface of a predetermined width is formed on the upper portion thereof and connected with respect to one of the spring-biased contact members to allow the guide surface to slidably guide the predetermined portion of an object coming into contact therewith along a predetermined direction while bending one spring-biased contact member. A selector is provided at the other of the spring-biased contact members, the selector being formed thereon with a triangular projection of which the upper and portion is outwardly projected at a predetermined distance through and from the guide surface. The triangular projection of the selector is forcedly pushed to the position of the guide surface in the backward direction by the object while bending the other spring-biased contact member as a function of the shape of the predetermined portion of the object, to keep the contacts in a state of being contacted with or separated from each other by the bending of the other spring-biased contact member, to thereby automatically select said deformation of the object.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like reference numerals designate the same parts throughout the figures thereof and wherein:

FIG. 3 is a front view partly in section illustrating a first embodiment of a selection switch according to the present invention wherein the switch is formed into a normal-open type;

FIG. 4 is a sectional view taken along the line 4—4 of FIG. 3;

FIG. 5 is a front view partly in section illustrating a second embodiment of a selection switch according to the present invention wherein the switch is also formed into a normal-open type;

FIG. 6 is a front view partly in section illustrating a third embodiment of a selection switch according to the present invention which is the normal-open type;

FIG. 7 is a front view partly in section illustrating a fourth embodiment of a selection switch according to the present invention, the switch being also the normal-open type;

FIG. 8 is a front view partly in section showing a modification of the first embodiment of FIG. 3 into a normal-close type;

FIG. 9 is a sectional view taken along the line 9—9 of FIG. 8;

FIG. 10 is a front view partly in section showing a modification of the second embodiment of FIG. 5 into a normal-close type;

FIG. 11 is a front view partly in section showing a modification of the thrid embodiment of FIG. 6 into a normal-close type; and FIG. 12 is a front view partly in section showing a modification of the fourth embodiment of FIG. 7 into a normal-close type.

DETAILED DESCRIPTION OF THE PREFERRED EMBODIMENTS

Figure 2:
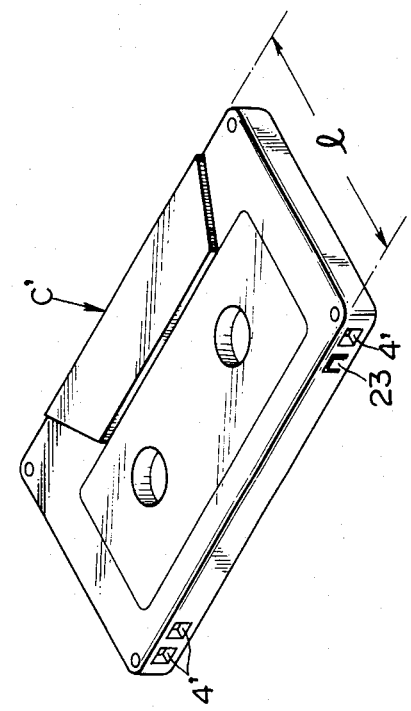
FIG. 2 is a perspective view showing a cassette for a cassette tape recorder which is one of objects for actuating a selection switch of the present invention.
Figure 1:
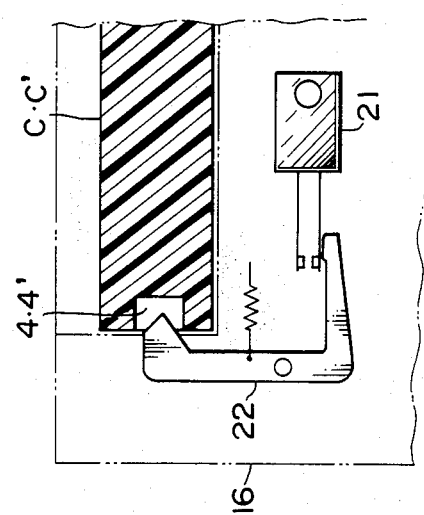
FIG. 1 is a schematic view showing the manner of operation of a conventional selection switch.

Now, a selection switch according to the present invention will be described hereinafter with reference to the accompanying drawings.

FIG. 3 shows a first embodiment of a selection switch according to the present invention, wherein the selection switch is formed as a normal-open type and constructed to connect a guide and cover member indirectly to one of several spring-biased contact members.

More particularly, the selection switch includes a swtich body S and a guide and cover member $D_2$. The switch body S comprises a base 1 formed of an insulating material such as plastic and a pair of spring-biased contact members A and B embedded at a part thereof in the base 1 so as to extend from the base in parallel with each other. The contact member may be embedded in the base by insert molding. The contact members A and B respectively have contacts a and b provided thereon so as to oppose to each other. The contact member A has a connecting member 6 fitted thereon which is positioned adjacent to the contact a, with a pair of projections 5 being formed on the both sides of the member 6. The connecting member 6 may be formed concurrent with formation of the base 1 by insert molding. The contact member B has selector E fitted thereon so as to be positioned in proximity to the contact b. The selector E is provided thereon with a triangular projection 3 which is adapted to outwardly project through a top plate 7 of the guide and cover member $D_2$ explained hereinafter. The contact member B also has a spacer 9 securely fitted thereon and placed adjacent to the base portion 8 thereof. The spacer 9 may be formed in substantially the same manner as the connecting member 6. The spacer acts to keep the spacing between the contact members A and B constant.

The guide and cover member $D_2$ is made of an insulating plastic material by molding. In the embodiment, the guide and cover member is formed into a hollow body 10 which is rectangular in section and which has a configuration and dimensions sufficient to substantially cover each of the contact members except the base portion 8 thereof. The body 10 is formed with a slit 11 at the central portion of the top plate 7 thereof. The body 10 is also formed on the inner surface of each of the side walls thereof with a groove 12 extending in the longitudinal direction and having a small hole 13 provided at the end thereof.

The guide and cover member $D_2$ is fitted on the switch body S by inserting the selector E through an opening 14 of the core member and into the slit 11 to allow the triangular portion 3 to project outwardly from the top plate 7, fitting the projections 5 of the connecting member 6 in the grooves 12 and sliding the projections 5 along the grooves 12 to fit the projections 5 in the small holes 13, and positioning the spacer 9 at the opening 14. The contact member A may be have a spacer 15 fitted on the base portion 8 thereof and positioned at the opening 14, which acts to prevent dust from entering the interior of the member $D_2$.

The manner of operation of the selection switch according to the present embodiment will be explained hereinafter.

The switch is adapted to be open in a normal state due to separation of the contacts a and b from each other. When a cassette C', for example, having chrome tape for a cassette tape recorded received therein starts to be inserted in the tape recorder, the rear surface of the cassette C' strikes on a guide surface 2 of the guide and cover member $D_2$ to outwardly force the member $D_2$, so that the contact element A is outwardly bent together with the member $D_2$, because it is connected through the connecting member 6 with the guide and cover member $D_2$. In this instance, the contact element B is also bent outwardly at the same distance, since it is outwardly forced by the spacer 9 contacting with the inner surface of the top plate 7 of the guide and cover member $D_2$ and the base portion 3' of the selector E. Thus, the contacts a and b are kept in a state of being separated from each other.

Subsequently, the cassette C' is fully inserted in the tape recorder. In this case, when a cassette which has not been formed with a recess 4' is inserted, the triangular projection 3 of the selector E is forcedly pushed in the backward direction by the rear surface of the cassette, so that the contact element B is outwardly bent to allow the contacts a and b to be contacted with each other; thus, the switch is closed.

On the contrary, when a cassette C' used is formed with a recess 4', the triangular projection 3 of the selector E is fitted in the recess 4' to permit the contacts to be separated from each other. This results in the switch remaining open.

Thus, it will be noted that the selection switch of the first embodiment is adapted to effectively confirm the recess 4' of the cassette C' corresponding in position to the switch by the make and break action thereof or confirm the recess to operate the contacts. For example, when a cassette having a chrome tape is inserted, the triangular projection 3 of the selector E of the selection switch arranged corresponding in position of a recess 4' of the cassette is fitted in the recess to keep the switch open, whereas, contacts a and b of each of the remaining switches are contacted with each other to close the switches due to lack of the corresponding recesses. Thus, it may be effectively confirmed that the chrome tape has been inserted.

Also, it will be readily noted that the selection switch is capable of accomplishing the prevention of overlapping recording on a tape, the detection of insertion of cassette in a tape recorder or the like in a similar manner.

Further, the selection switch of the present embodiment, as described hereinbefore, is constructed in the manner that a cassette C' is first contacted at the end thereof with the projecting end portion of the guide surface 2 of the guide and cover member $D_2$ and the strikes the top plate 7 of the guide surface 2 to press the plate 7, to thereby bend the spring-biased contact members A and B while keeping spacing therebetween constant by means of the spacer 9 and the base portion 3' of the selector E. Thus, the selection switch has a significant advantage that it can effectively absorb a variation in depth dimension between cassettes to be used, as a function of the degree of bending. In addition, the selection switch also can keep the spacing between the contacts a and b constant irrespective of any degree of bending.

Furthermore, in the selection switch of this embodiment, the triangular projection 3 of the selector E is fitted into a cassette only when a cassette formed with a recess 4' is inserted; and, when such recess 4' is not formed in a cassette C', the triangular projection 3 is forced by the rear surface of the cassette to allow only the contact member B to be outwardly bent, to thereby carry out a contact between the contacts a and b. In this instance, the selection switch can effectively allow the contacts a and b to be accurately contacted with each other irrespective of variations in dimensions of cassettes to be used, because the spacing between the contacts a and b are kept constant. This also results in the selection switch ensuring separation of the contacts from each other in the case of a cassette provided with a recess 4' having been inserted, irrespective of variations in depth dimension between cassettes to be used.

FIG. 5 illustrates a second embodiment of a selection switch according to the present invention.

The second embodiment is constructed in a manner to connect a guide member $D_1$ directly to one of spring-biased contact members or a contact member A.

More particularly, the guide member $D_1$ in the selection switch of the second embodiment is made to have only a guide surface 2. The guide member $D_1$ is formed by insert molding together with other insulating members such as insulating base 1, a spacer 9, a selector E and the like, so that it may be integrally and directly fixed with respect to the end portion of the contact member A.

Thus, it will be noted that the second embodiment is constructed in substantially the same manner as the first embodiment, except the cover section of the guide and cover member $D_2$ and the connecting member 6 and in the first embodiment of FIG. 3. In FIG. 5, reference numeral 17 indicates a separator provided on the lower surface of the guide member $D_1$ which is adapted to carry out the same function as the base portion 3' of the selector E in the first embodiment. More specifically, the separator 17 acts to outwardly force a contact member B when an object C (Cassette C') comes into contact with the guide surface 2 to outwardly bend the contact member A, so that the contact member B may be outwardly bent at the same distance as the member A to keep the spacing between contacts a and b constant.

In view of the foregoing, it will be readily noted that the essential part of the second embodiment is constructed in the substantially same manner as that of the first embodiment, thus, the former is capable of effectively carrying out the same function as the latter.

A third embodiment of a selection switch according to the present invention is shown in FIG. 6, which includes a guide and cover member $D_3$ slightly different from the cover portion, the guide and cover member $D_2$ of the first embodiment. The guide and cover member $D_3$ is formed at the rear portion thereof with an extension 18, which is swingably connected with an insulating base 1 by means of a pin 19 so that the guide and cover member $D_3$ may rotated about the pin 19 in the vertical direction.

In the third embodiment constructed in the manner as mentioned above, the guide and cover member $D_3$ can effectively cover spring-biased contact members A and B as compared with the guide and cover member $D_2$ of the first embodiment, to thereby significantly protect the contact members. Also, the third embodiment is capable of carrying out a rotational function with high precision because the pin 19 acts as a center of rotation.

The remaining part of the third embodiment is constructed in the substantially same manner as the first embodiment shown in FIG. 3, thus, it will be also noted that the third embodiment is capable of also accomplishing the same function and advantage as the first embodiment.

FIG. 7 illustrates a fourth embodiment of a selection switch according to the present invention. The fourth embodiment includes a further spring-biased contact member F embedded at a part thereof in the insulating base 1 so as to extend in parallel with spring-biased members A and B otherwise, this embodiment has substantially same construction as the second embodiment. The contact member F is provided thereon with a contact f. In this fourth embodiment, when a selector E is backwardly pushed by an object C or a cassette C' to outwardly bend the contact member B to allow contacts a and b to be contacted with each other; a separator 20 provided at the end portion of the contact member B outwardly bends the contact member F to cause the contact f of contact number F to separate from the contact a of the contact member A, so that the switch may carry out a further switching operation.

As can be seen from the foregoing, the selection switch of each of the first to fourth embodiments explained hereinbefore is the normal-open type whose the contacts are separated from each other in a normal state by embedding the spring-biased contact members A and B in the insulating base 1 so as to allow the contact members to be separated from each other with constant spacing and are contacted with each other by forcedly bending one of the contact members. However, the present invention is not limited to a selection switch of such normal-open type. More particularly, the present invention includes a selection switch of the normal-close type adapted to allow the contacts a and b to be contacted with each other in a normal state and to be separated from each other by forcedly bending one of the contact members A and B.

FIGS. 8 to 12 respectively illustrate modifications obtained by changing the embodiments of the normal-open type selection switch shown in FIGS. 3 to 7 to the normal-close type. In the modifications shown in FIGS. 8 to 12, each of the selection switches is constructed so that spring-biased contact members A and B in parallel with each other are embedded at a part thereof in an insulating base 1 in a manner contrary to the normal-open type selection switches shown in FIGS. 3 to 7. For example, each of the normal-close type selection switches is constructed to elastically contact contacts a and b with each other in a normal state utilizing an elastic force of the bent spring-biased contact member B. The selection switches switches of the normal-close type illustrated are constructed in the substantially same manner as those of the normal-open type shown in FIGS. 3 to 7, except the construction that the contacts a and b of the spring-biased contact members A and B are contacted with each other in a normal state and are separated from each other by forcedly bending one of the contact members. Thus, in view of the fact that like reference characters are used, in FIGS. 8 to 12, to indicate the same parts as in the embodiments of FIGS. 3 to 7, it will be readily understood without requiring any further description that the normal-close type selection switches shown in FIGS. 8 to 12 are capable of accomplishing substantially the same function and advantanges as the normal-open type selection switches.

As many apparently widely different embodiments of this invention may be made without departing from the spirit and scope thereof, it is to be understood that the invention is not limited to the specific embodiment thereof except as defined in the appended claims.

What is claimed is:

1. A selection switch for identifying an object having a predetermined shape at a predetermined portion thereof, said switch comprising:

an insulating base;

at least two spring-biased contact members ebedded at a part thereof in said based so as to extend substantially in parallel with each other from said base;

contacts respectively provided on said spring-biased contact members so as to oppose to each other with a predetermined constant relative position;

a guide member having a guide surface of a predetermined width formed on a portion thereof and connected to one of said spring-biased contact members so as to allow said guide surface to slidably guide said predetermined portion of said object coming into contact therewith along a predetermined direction and to bend said one spring-biased contact member;

means maintaining said predetermined relative position between said contacts during bending of said one contact member by said guide member; and a selector provided on the other of said spring-biased contact members, said selector being formed thereon with a triangular projection of which the upper portion is outwardly projected by a predetermined distance through and from said guide surface, wherein said triangular projection of said selector can be forcedly pushed to the position of said guide surface by said object contacting therewith while bending said other spring-biased contact member as a function of said predetermined shape of said object so as to change said predetermined relative position by the bending of said other spring-biased contact member, to thereby automatically detect said shape of said object.

2. A selection switch as defined in claim 1, wherein said one spring-biased contact member is connected to said guide member by a connecting member, wherein said means for maintaining said predetermined relative position comprises a spacer engaged between said guide member and the other spring-biased contact member, and wherein said connecting member is connected with an inner surface of said guide member for connecting said one spring-biased contact member to said guide member.

3. A selection switch as defined in claim 1, wherein said guide member is formed into a hollow body which is rectangular in section which has dimensions sufficient to cover most of the length of said spring-biased contact members, said hollow body having a slit formed at an upper surface thereof, said triangular projection of said selector projecting outward by a predetermined distance through said slit of said guide member.

4. A selection switch as defined in claim 1, wherein said guide member has an extension extending to said insulating base, said guide member being pivotally connected to said insulating base by means of a pin.

5. A selection switch as defined in claim 1, wherein one of said spring-biased contact members is formed in a state of being bent to allow said contacts to be elastically contacted in a normal state.

* * * * *